Patented May 16, 1933

1,909,690

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS

No Drawing. Application filed December 21, 1929, Serial No. 415,779, and in Germany April 8, 1927.

The present invention relates to the production of new vat dyestuffs.

Hitherto it has been necessary for producing fast black dyeings on cotton to use mixtures of several dyestuffs or to develop the green coloration obtained by dyeing with aminodibenzanthrone with oxidizing agents.

We have now found that new vat dyestuffs which dye cotton in a single operation grey to black shades of excellent fastness and which for this reason are particularly valuable are obtained by condensing dibenzanthrones which contain at least one nitrogen atom to which is attached a reactive hydrogen atom, with polynuclear aromatic compounds containing at least one negative substituent, the said components being employed in such proportions as to produce dyestuffs in which the negative substituents are completely eliminated. Preferably aminodibenzanthrone or derivatives or homologues thereof are employed for the condensation. As regards the polynuclear aromatic compounds containing one or more negative substituents, these may belong to the isocyclic or heterocyclic series and the negative substituents may be for example halogen atoms or nitro groups or the like. Suitable aromatic compounds are for example ms-benzdianthrones, ms-naphtho-dianthrones, allo-ms-naphthodianthrones, ms-anthradianthrones, dibenzanthrones, iso-dibenzanthrones, dibenzopyrenequinones, anthraquinoneazines, flavanthrones, anthrimides, carbazols, naphthazines, phenanthrones, fluorenes or pyranthrones which contain at least one negative substituent such as halogen. Use may also be made of negatively substituted anthraquinones, benzanthrones, anthanthrones, naphthalene derivatives or the like. The higher the molecular weight of the products obtained, that is to say the higher the number of negative substituents entering into reaction, the more valuable is the dyestuff obtained. The said dyestuff probably corresponds to the general formula:

where R stands for a dibenzanthrone radicle, $R_1$ stands for a polynuclear aromatic radicle, which may be substituted for example by further radicles of the type

and X stands for hydrogen or a lower alkyl radicle, such as methyl, ethyl or propyl groups. As pointed out above the resulting products must be free from negative substituents because in this case particularly valuable dyestuffs are obtained.

The condesation is suitably carried out in solvents or diluting media of high boiling point such as naphthalene and nitrobenzene and acid-fixing agents such as sodium acetate, sodium carbonate and potassium carbonate and catalysts such as copper salts are preferably added. Excellent yields of the new dyestuffs are obtained. The reaction products are black to nearly black powders dissolving in concentrated sulphuric acid usually to a violet solution. From the vat they dye cotton depending on the amount of dyestuff used from blue-grey or violet-grey to greenish-black or black shades of excellent fastness.

In the above described condensation process nitro compounds of dibenzanthrones may be used as the nitrogenous component if a reducing agent such as hydrazine hydrate or sulphur or hydrogen sulphide and the like be added to the reaction mixture.

The following examples will further illustrate the nature of this invention but the invention is not restricted thereto. The parts are by weight.

Example 1

47.5 parts of amino-dibenzanthrone obtainable by the caustic alkali fusion of benzanthrone and subsequent nitration and reduction, are boiled for 15 hours, while stirring, in 1000 parts of nitrobenzene mixed with 24 parts of alpha-chlor-anthraquinone, 30 parts of sodium acetate and 5 parts of copper carbonate. The reaction product is filtered off by suction while hot, and the inorganic constituents are removed by boiling the residue with water. The dark coloured dyestuff which probably corresponds to the formula

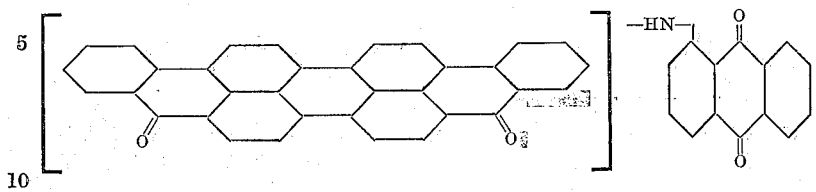

may be recrystallized from concentrated sulphuric acid, in which it dissolves to a violet solution. The dyestuff gives a blue vat and dyes cotton grey to black shades of excellent fastness.

*Example 2*

To a suspension of 47 parts of amino-dibenzanthrone obtainable as described in Example 1, in 1500 parts of nitrobenzene, are added 25 parts of sodium acetate, 3 parts of copper carbonate and 24 parts of beta-chloranthraquinone, and the mixture is boiled for 20 hours while stirring. The reaction product is worked up as described in Example 1. The dyestuff obtained is a blue-black powder and dyes cotton from a blue vat blue-black shades of excellent fastness.

*Example 3*

A suspension of 46 parts of dibrom-anthanthrone obtainable by treating anthanthrone under mild conditions at moderate temperature with a brominating agent, 95 parts of amino-dibenzanthrone, obtainable as described in Example 1, 40 parts of sodium acetate and 5 parts of copper oxide in 2000 parts of nitrobenzene is boiled for 20 hours while stirring. The reaction product is filtered off by suction while hot and is worked up in the usual manner. The dyestuff is a black powder which dissolves in concentrated sulphuric acid to a violet solution and gives a blue vat and dyes cotton grey to black shades of excellent fastness.

*Example 4*

47 parts of dichlor-allo-ms-naphthodianthrone are dissolved in 1000 parts of nitrobenzene, 95 parts of amino-dibenzanthrone (see Example 1), 30 parts of sodium acetate and 3 parts of copper oxide are added, and the mixture is boiled for 6 hours while stirring. The reaction product is worked up as described in Example 1. The dyestuff is a black powder which dissolves in concentrated sulphuric acid to a violet solution and dyes cotton from a blue vat black shades of excellent fastness.

*Example 5*

65 parts of tribromo-pyranthrone, 144 parts of amino-dibenzanthrone (see Example 1), 50 parts of sodium acetate and 15 parts of copper carbonate are boiled for 24 hours in 2000 parts of nitrobenzene while stirring. The reaction product is filtered off by suction while hot and is worked up as aforementioned. A black powder free from halogen is obtained which gives a blue vat and dyes cotton grey to black shades of excellent fastness.

*Example 6*

47 parts of amino-dibenzanthrone (see Example 1), 50 parts of nitrodibenzanthrone, 30 parts of sodium acetate and 10 parts of copper carbonate are suspended in 2000 parts of nitrobenzene and boiled for about 24 hours while vigorously stirring. The reaction product is filtered off by suction while hot and worked up in the usual manner. The dyestuff is obtained as a black powder which dissolves in concentrated sulphuric acid to a violet solution and gives a blue vat from which cotton is dyed grey to black shades of excellent fastness.

*Example 7*

50 parts of nitrodibenzanthrone, 18 parts of tetrabrompyranthrone, 20 parts of sodium acetate and 5 parts of copper carbonate are slowly heated to boiling in 1000 parts of nitrobenzene with 20 parts of hydrazine hydrate and kept at this temperature for 20 hours. The reaction product which probably corresponds to the formula

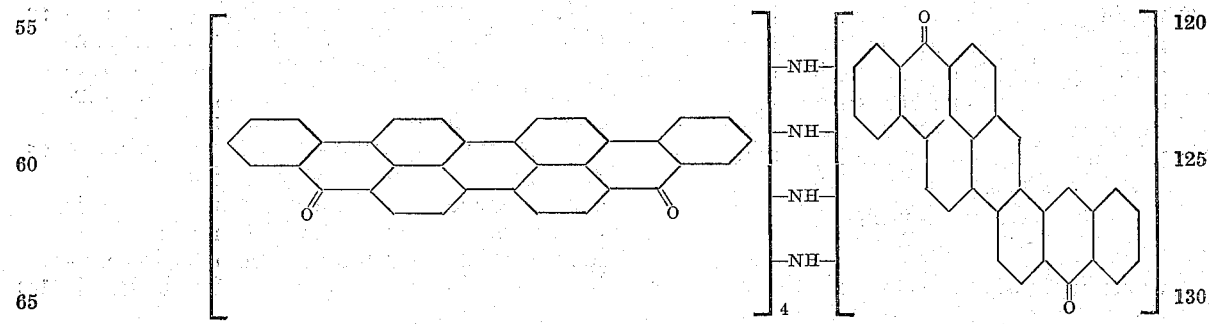

is filtered off by suction while hot and is worked up in the usual manner. The black powder obtained dissolves in concentrated sulphuric acid to a violet solution and dyes cotton from a blue vat grey to black shades of excellent fastness.

Example 8

65 parts of tribrom-pyranthrone, 50 parts of sodium acetate and 5 parts of copper carbonate are suspended in 2000 parts of nitrobenzene and 144 parts of the amino-dibenzanthrone obtainable by acting on dibenzanthrone with hydroxyl-amine are added thereto and the mixture is boiled for 24 hours while stirring. The reaction product is filtered off by suction while hot and worked up as usual. The black powder obtained dyes cotton grey-brown to black shades of excellent fastness.

Example 9

47 parts of amino-dibenzanthrone (see Example 1) are heated in a boiling mixture of 1000 parts of naphthalene, 100 parts of 1-nitro-naphthalene, 30 parts of sodium acetate, 3 parts of copper oxide and 3 parts of copper carbonate until the formation of the dyestuff is complete. The dyestuff is then filtered off by suction and worked up in the usual manner. A black powder with a bluish tinge is thus obtained, which yields a violet coloured solution in concentrated sulphuric acid, and which dyes cotton from a blue hydrosulphite vat bluish-grey to bluish-black shades of excellent fastness.

Example 10

94 parts of amino-dibenzanthrone (see Example 1) are suspended in 1000 parts of nitrobenzene and 30 parts of 1.5-dinitro-anthraquinone, 30 parts of sodium acetate, 1 part of copper oxide and 1 part of copper carbonate are added and the mixture is boiled until the formation of the dyestuff is complete. The dyestuff is then filtered off by suction and worked up as described in Example 1. The new dyestuff which is a black powder dissolves in concentrated sulphuric acid to a violet coloured solution, and yields bluish-grey to black dyeings from a blue vat of remarkable fastness.

Example 11

35 parts of tetrabrom-ms-benzodianthrone (obtainable by brominating ms-benzodianthrone in nitrobenzene at between 160° and 180° C.) are boiled in 1000 parts of nitrobenzene after the addition of 50 parts of sodium acetate, 10 parts of copper oxide and 94 parts of amino-dibenzanthrone while stirring, until the reaction product is practically free from halogen. The product is worked up in the usual manner. The resulting dyestuff is a black powder dissolving in concentrated sulphuric acid with a violet coloration and dyeing cotton from a blue vat grey to black shades of excellent fastness and especially good fastness to bucking.

Example 12

42 parts of trichloranthraquinone-2.1-benzacridone (obtainable by chlorinating anthraquinone-2.1-benzacridone in nitrobenzene in the presence of iodine with the aid of sulphuryl chloride) are boiled in 1000 parts of nitrobenzene after the addition of 141 parts of aminodibenzanthrone, 50 parts of sodium acetate and 2.5 parts of copper oxide while stirring, until the reaction product is practically free from chlorine. The dyestuff which is worked up in the usual manner, is a black powder which dissolves in concentrated sulphuric acid with a violet coloration and dyes the vegetable fibre grey to black shades of excellent fastness and in particular excellent fastness to boiling with water and caustic alkali solutions.

Example 13

49 parts of dibrom-3.4.8.9-dibenzopyrene-5.10-quinone are boiled in 1000 parts of nitrobenzene after the addition of 10 parts of copper sulphate, 50 parts of sodium acetate and 92 parts of amino-dibenzanthrone while stirring, until the reaction product is practically free from bromine. The dyestuff which is separated in the usual manner, is a black powder dyeing the vegetable fibre from a blue vat greenish-grey shades of excellent fastness.

Example 14

29 parts of dibrom derivative of benzanthrone - pyrazolanthrone obtainable by brominating the latter in nitrobenzene are boiled in 1000 parts of nitrobenzene after the addition of 50 parts of sodium acetate, 7 parts of copper acetate and 47 parts of aminodibenzanthrone while stirring until the reaction product is practically free from halogen. The mass is allowed to cool and worked up in the usual manner. The dyestuff obtained which probably corresponds to the formula

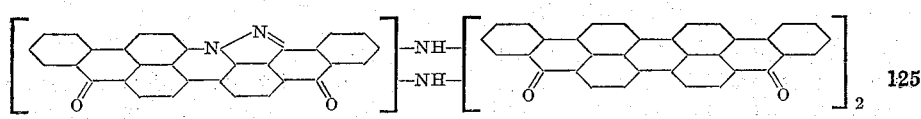

is a black powder dissolving in concentrated sulphuric acid with a violet coloration and dyes cotton from a blue vat grey shades of excellent fastness.

Example 15

41 parts of monobrom-4.5.8.9-dibenzopyrene-3.10-quinone (obtainable by brominating 4.5.8.9-dibenzopyrene-3.10-quinone in nitrobenzene) are boiled in 500 parts of nitrobenzene after the addition of 45 parts of sodium acetate, 10 parts of copper oxide and 47 parts of aminodibenzanthrone while stirring, until the reaction product is practically free from halogen. The dyestuff is separated in the usual manner. It is a black powder dissolving in concentrated sulphuric acid with a violet coloration and dyes cotton from a blue vat greenish-grey shades of excellent fastness.

Example 16

5.6 parts of 3.3'-dibromflavanthrone are boiled in 250 parts of naphthalene after the addition of 5 parts of soda ash, 1 part of copper carbonate and 9.4 parts of amino-dibenzanthrone while stirring, until the reaction product is practically free from bromine. The mass is worked up in the usual manner. The resulting dyestuff is a black powder dissolving in concentrated sulphuric acid with a violet coloration and dyes the vegetable fibre from a blue vat olive-black shades of very good fastness.

A reaction product dyeing similar shades is obtained by condensing 3.6 parts of dibromphenanthrenequinone with 9.4 parts of amino-dibenzanthrone.

Example 17

4.5 parts of dichlorperylenequinone are boiled in 150 parts of nitrobenzene after the addition of 5 parts of sodium acetate, 1 part of copper oxide and 9.4 parts of aminodibenzanthrone while stirring, until a reaction product free from chlorine is obtained which is worked up in the usual manner. The resulting dyestuff is a black powder dissolving in concentrated sulphuric acid with a violet colouration and dyeing the vegetable fibre from a blue vat grey to black shades of excellent fastness.

Example 18

53 parts of 6.6'-dichlorisodibenzanthrone are boiled in 1500 parts of nitrobenzene after the addition of 50 parts of sodium acetate, 80 parts of copper oxide and 94 parts of aminodibenzanthrone while stirring, until the reaction product is practically free from chlorine. The dyestuff which is isolated in the usual manner, is a blue-black powder which dissolves in concentrated sulphuric acid with a violet colouration and dyes the vegetable fibre from a blue vat bluish-grey to black shades of excellent fastness.

Example 19

62 parts of dibrom-dibenzanthrone are boiled in 1000 parts of nitrobenzene after the addition of 94 parts of aminodibenzanthrone, 50 parts of soda ash and 10 parts of copper oxide while stirring, until the reaction product is practically free from bromine. The reaction mass is worked up in the usual manner. The resulting dyestuff is a black powder dissolving in concentrated sulphuric acid with a violet colouration and dyeing the vegetable fibre from a blue vat grey to black shades of excellent fastness.

Example 20

26.5 parts of 6-chlorbenzanthrone are boiled in 500 parts of nitrobenzene with 20 parts of sodium acetate, 5 parts of copper carbonate and 47 parts of aminodibenzanthrone while stirring, until the reaction product is practically free from chlorine. The dyestuff is separated in the usual manner. It is a black powder dissolving in concentrated sulphuric acid with a violet colouration and dyeing cotton from a grey vat greenish-grey to black shades of excellent fastness.

Example 21

30 parts of the dibrom derivative of N.N'-dimethyl-2.2'-dipyrazolanthronyl are boiled in 1000 parts of nitrobenzene and 30 parts of sodium acetate, 5 parts of copper oxide and 47 parts of aminodibenzanthrone while stirring, until the reaction product is practically free from bromine. The mass is worked up in the usual manner. The resulting dyestuff which probably corresponds to the formula

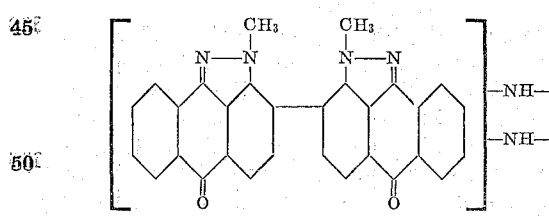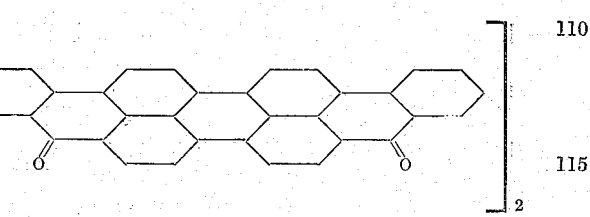

is a violet-black powder dissolving in concentrated sulphuric acid with a reddish-blue colouration and dyes cotton from a blue vat violet-grey to bluish-black shades of excellent fastness.

Example 22

6.6 parts of the dibrom derivative of the dyestuff, obtainable by condensing benzidine with 1-chloranthraquinone-2-carboxylic acid and subsequently splitting off water, are boiled in 250 parts of nitrobenzene with 10 parts of sodium acetate, 2 parts of copper oxide and 9.4 parts of aminodibenzanthrone while stirring, until a reaction product practically free from bromine is obtained which is worked up in the usual manner. The resulting dyestuff dissolves in concentrated sulphuric acid with a reddish-violet colouration and dyes the vegetable fibre grey to black shades of excellent fastness from a blue vat.

*Example 23*

30 parts of dibromdiphthaloylacridone (obtainable by brominating diphthaloylacridone in chlorosulphonic acid) are boiled in 1000 parts of nitrobenzene with 30 parts of sodium acetate, 10 parts of copper oxide and 47 parts of aminodibenzanthrone while stirring, until the reaction product is practically free from bromine. The resulting dyestuff, of which an excellent yield is obtained by isolation in the usual manner, is a black powder dissolving in concentrated sulphuric acid with a violet colouration and dyes cotton grey shades of excellent fastness from a blue vat.

*Example 24*

1 part of 2.4-dichlorquinazoline are boiled in 100 parts of nitrobenzene with 1 part of sodium acetate, 0.1 parts of copper oxide and 4.7 parts of aminodibenzanthrone while stirring, until a reaction product practically free from chlorine is obtained which is worked up in the usual manner. The resulting dyestuff dissolves in concentrated sulphuric acid with a reddish-violet colouration and dyes cotton from a blue vat bluish-green shades of excellent fastness.

*Example 25*

23.5 parts of aminodibenzanthrone are boiled in 1000 parts of nitrobenzene with 25 parts of mononitroisodibenzanthrone, 25 parts of potassium carbonate and 7 parts of copper oxide for 10 to 15 hours while stirring. The reaction mass is worked up in the usual manner. The resulting dyestuff is a blue-black powder dissolving in concentrated sulphuric acid with a violet colouration and dyeing cotton from a blue vat dark blue to blue-black shades of very good fastness.

*Example 26*

8 parts of tetrachlor-isodibenzanthrone (obtainable by chlorinating iso-dibenzantrone in chlorosulphonic acid) are boiled in 500 parts of nitrobenzene with 10 parts of sodium acetate, 2 parts of copper oxid and 19 parts of aminodibenzanthrone while stirring, until a reaction product practically free from bromine is obtained which is worked up in the usual manner. The resulting dyestuff is a black powder which dissolves in concentrated sulphuric acid with a violet colouration and dyes cotton grey to black shades of excellent fastness from a blue vat.

*Example 27*

12.6 parts of dibrom-Bz.2-Bz.2'-dimethoxy-dibenzanthrone (obtainable by brominating Bz.2-Bz.2'-dimethoxy-dibenzanthrone in nitrobenzene in the presence of iodine and iron) are boiled in 300 parts of nitrobenzene with 15 parts of sodium acetate, 2 parts of copper carbonate and 19 parts of aminodibenzanthrone while stirring, until the reaction product is practically free from bromine. The mass is worked up in the usual manner. The resulting dyestuff dissolves in concentrated sulphuric acid with a violet colouration and dyes cotton dark green shades of excellent fastness from a blue vat.

*Example 28*

7.2 parts of dibromphenanthrene (obtainable by brominating phenanthrene in glacial acetic acid) are boiled in 250 parts of nitrobenzene after the addition of 19 parts of aminodibenzanthrone, 20 parts of sodium acetate and 2 parts of copper oxide while stirring, until a reaction product practically free from bromine is obtained which is worked up in the usual manner. The resulting dyestuff which probably corresponds to the formula

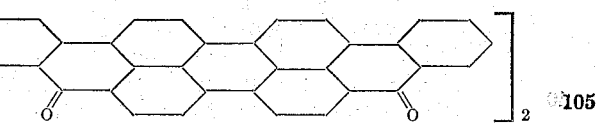

is a black powder which dissolves with a violet colouration in concentrated sulphuric acid and dyes cotton grey to black shades of excellent fastness from a blue vat.

A condensation product dyeing similar shades is obtained by condensing 1 molecular proportion of dibromfluorene with 2 molecular proportions of aminodibenzanthrone.

This application is a continuation-in-part of our copending application Ser. No. 267,478, filed April 4, 1928.

What we claim is:—

1. A process for the production of vat dyestuffs which comprises condensing in the presence of a copper compound, a dibenzanthrone containing at least one nitrogen atom with a reactive hydrogen atom attached thereto with a polynuclear aromatic compound containing at least one negative substituent selected from the group consisting of halogen and nitro groups, the said reagents being employed in such proportions as to completely eliminate the negative substituents.

2. A process for the production of vat dyestuffs which comprises condensing in the presence of a copper compound a dibenzanthrone containing at least one nitrogen atom with a reactive hydrogen atom attached thereto with a polynuclear aromatic compound containing at least one negative substituent selected from the group consisting of halogen and nitro groups in the presence of an acid fixing agent, the said reagents being employed in such proportions as to completely eliminate the negative substituents.

3. A process for the production of vat dyestuffs which comprises condensing in the presence of a copper compound a dibenzanthrone containing at least one nitrogen atom with a reactive hydrogen atom attached thereto with a polynuclear aromatic compound containing at least one negative substituent selected from the group consisting of halogen and nitro groups in the presence of an inert organic diluent of high boiling point, the said reagents being employed in such proportions as to completely eliminate the negative substituents.

4. A process for the production of vat dyestuffs which comprises condensing a dibenzanthrone containing at least one nitrogen atom with a reactive hydrogen atom attached thereto with a ploynuclear aromatic compound containing at least one negative substituent selected from the group consisting of halogen and nitro groups in the presence of a copper salt, the said reagents being employed in such proportions as to completely eliminate the negative substituents.

5. A process for the production of vat dyestuffs which comprises condensing in the presence of a copper compound a nitrodibenzanthrone in the presence of a reducing agent with a polynuclear aromatic compound containing at least one negative substituent selected from the group consisting of halogen and nitro groups, the said reagents being employed in such proportions as to completely eliminate the negative substituents.

6. Grey to black vat dyestuffs giving bluish vats and violet solutions in concentrated sulphuric acid, the said dyestuffs probably corresponding to the general formula:

in which R stands for a dibenzanthrone radicle and $R_1$ stands for a polynuclear aromatic radicle, said products being free from halogen and nitro groups.

7. Grey to black vat dyestuffs giving bluish vats and violet solutions in concentrated sulphuric acid, the said dyestuffs corresponding to the general formula

in which R stands for a dibenzanthrone radicle and $R_1$ for a polynuclear aromatic radicle, which is substituted by at least one further radicle of the type

said products being free from halogen and nitro groups.

8. Grey to black vat dyestuffs giving bluish vats and violet solutions in concentrated sulphuric acid, the said dyestuffs corresponding to the general formula

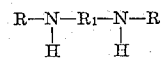

in which R stands for a dibenzanthrone radicle and $R_1$ for a radicle containing at least 3 rings, said products being free from halogen and nitro groups.

9. Grey to black vat dyestuffs giving bluish vats and violet solutions in concentrated sulphuric acid, the said dyestuffs corresponding to the general formula

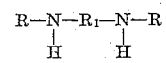

in which R stands for a dibenzanthrone radicle and $R_1$ for a radicle containing at least 5 rings, said products being free from halogen and nitro groups.

10. Grey to black vat dyestuffs giving bluish vats and violet solutions in concentrated sulphuric acid, the said dyestuffs corresponding to the general formula

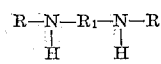

in which R stands for a dibenzanthrone radicle and $R_1$ for a pyranthrone radicle, said products being free from halogen and nitro groups.

11. Grey to black vat dyestuffs giving bluish vats and violet solutions in concentrated sulphuric acid, the said dyestuffs corresponding to the general formula

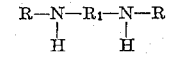

in which R stands for a dibenzanthrone radicle and $R_1$ for a heterocyclic radicle containing at least 5 rings, said products being free from halogen and nitro groups.

12. Grey to black vat dyestuffs giving bluish vats and violet solutions in concentrated sulphuric acid, the said dyestuffs corresponding to the general formula:

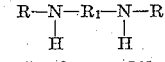

in which R stands for a dibenzanthrone radicle and $R_1$ for an anthraquinone-2.1-benzacridone radicle, said products being free from halogen and nitro groups.

In testimony whereof we have hereunto set our hands.

MAX ALBERT KUNZ.
KARL KOEBERLE.